United States Patent [19]

Grauer et al.

[11] Patent Number: 5,221,343
[45] Date of Patent: Jun. 22, 1993

[54] DISPERSANT, SETTING RETARDER AND AIR ENTRAINMENT ADDITIVE FOR CEMENT

[75] Inventors: Zvi Grauer, Dresher; Steven W. Rogers, Telford; Jose L. Villa, Warrington, all of Pa.

[73] Assignee: Henkel Corporation, Ambler, Pa.

[21] Appl. No.: 867,257

[22] Filed: Apr. 10, 1992

[51] Int. Cl.⁵ .............................................. C04B 24/38
[52] U.S. Cl. .................................... 106/729; 106/804; 106/805; 106/823
[58] Field of Search ............... 106/729, 804, 805, 823; 252/315.3; 536/22

[56] References Cited

U.S. PATENT DOCUMENTS

| | | | |
|---|---|---|---|
| 3,432,317 | 3/1969 | Kelly et al. | 106/734 |
| 3,547,828 | 12/1970 | Mansfield et al. | 252/351 |
| 3,598,865 | 8/1971 | Lew | 8/611 |
| 3,772,269 | 11/1973 | Lew | 252/8.9 |
| 4,210,456 | 7/1980 | Miller | 106/804 |
| 4,939,245 | 7/1990 | Rasche et al. | 536/18.6 |
| 5,154,771 | 10/1992 | Wada et al. | 106/823 |

*Primary Examiner*—Mark L. Bell
*Assistant Examiner*—Anthony J. Green
*Attorney, Agent, or Firm*—Ernest G. Szoke; Wayne C. Jaeschke; Daniel S. Ortiz

[57] ABSTRACT

The invention is a cement, water containing composition containing an organic polyglycoside. The composition has at least one of an increased air entraining capacity, a reduced viscosity and a retarded setting time.

17 Claims, 13 Drawing Sheets

DISPERSANT, SETTING RETARDER AND AIR ENTRAINMENT ADDITIVE FOR CEMENT

BACKGROUND OF THE INVENTION

Modern day aqueous cement containing compositions are complex mixtures of materials. The cement containing compositions can contain materials which increase or retard the setting rate, reduce the viscosity or slump of the cement containing mixture, increase air entrainment, reduce air entrainment and have other functions.

The present invention relates to an aqueous cement composition. More particularly, the invention concerns the incorporation into a cement composition of a glycoside surfactant composition as a dispersant, setting retarder, air entraining agent or a combination of such properties.

Dispersing agents are valuable in cement slurries in that they reduce the apparent viscosity of the slurry to permit easier handling of the cement slurry. However, the dispersing agents can also be useful in reducing the ratio of water to cement so that a stronger cement containing composition can be obtained.

As is well understood in the art, upon addition of water to Portland cement, an exotherm appears shortly thereafter due to the dissolution and wetting of the cement particles. The initial exotherm subsides and after an induction period, hydration or an accelerated setting phase begins. The two exotherms are clearly shown in FIG. 5 where the first exotherm occurs in about 10 minutes and the second hydration or accelerated setting exotherm occurs at about 490 minutes.

It is also necessary at times to retard the setting of cement. The present invention provides a composition which can retard the setting of cement for extended periods of time. In addition, a small amount of the additive of the present invention can substantially increase the air entrained in a cement containing composition. If the reduction in slump or the length of time the setting of cement must be retarded requires a substantial amount of the additive of the present invention, it may be necessary to introduce into the composition a foam inhibitor to reduce the amount of air entrained in the cement.

SUMMARY OF THE INVENTION

The present invention is a composition comprising water, hydraulic cement and an organic polyglycoside. The organic polyglycoside can be included in the composition at from about 0.001 percent to about 3.0 percent by weight of the cement in the composition.

The cement-water containing composition of the present invention can have a substantial reduction in viscosity, have the setting time substantially retarded, have the amount of air entrained in the cement substantially increased or a combination of the properties. At times, due to the air entrainment properties of the composition, it may be necessary to include in the composition a foam suppressing material to reduce the air entrainment.

The compositions of the present invention can also include sand, larger aggregates and other materials which are generally used in preparing cement or concrete compositions.

DETAILED DESCRIPTION OF THE INVENTION

Figure 1:
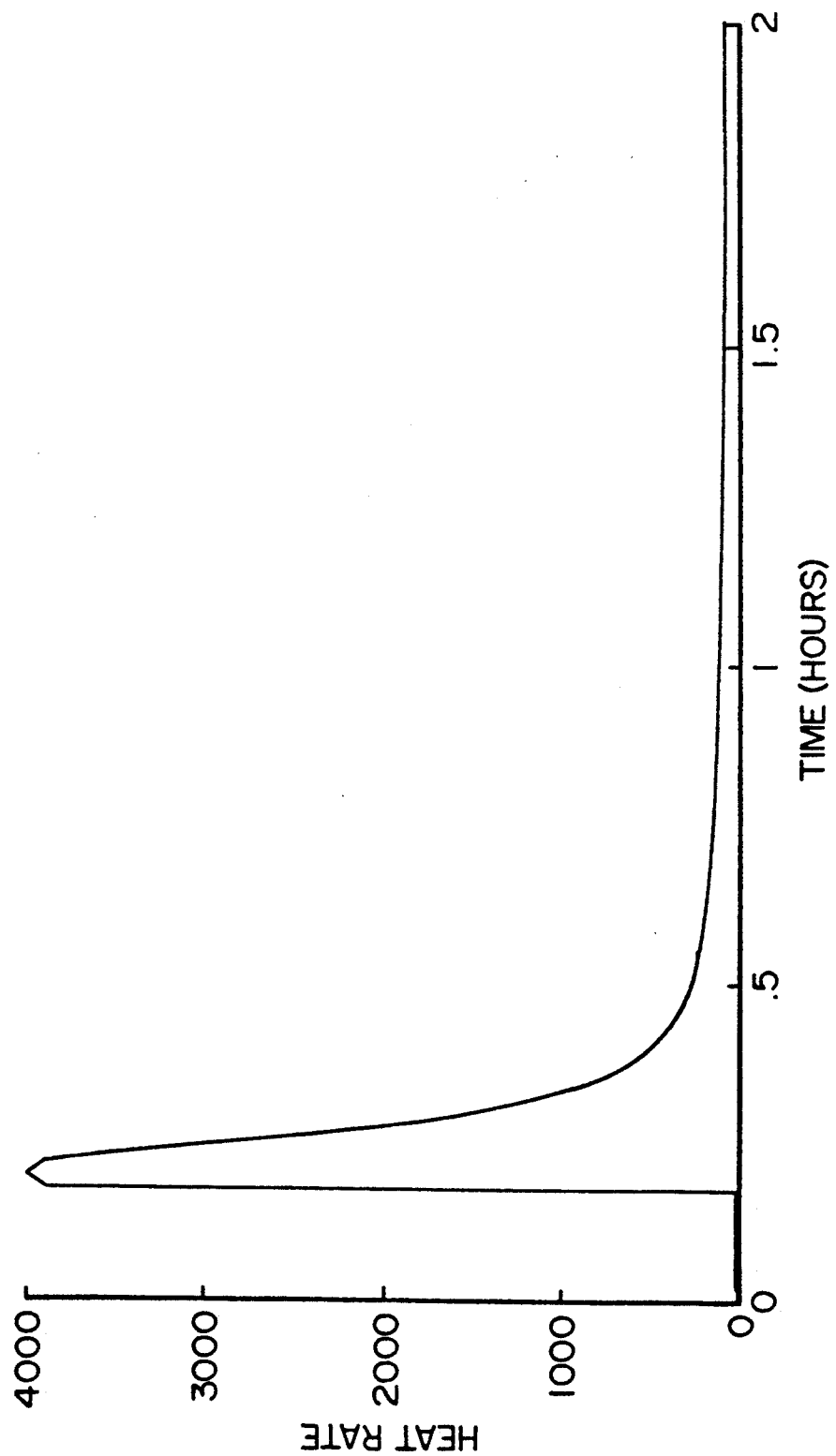
FIG. 1 is a graph showing rate of heat release for Portland cement at a water:cement ratio of 0.5 for a two hour period.

As used herein, hydraulic cement refers to calcium oxide, silica and alumina containing compositions which set into a hard mass when mixed with water. Particularly, hydraulic cement refers to cements such as ordinary Portland cement. Ordinary Portland cement is the predominant cement used in construction. The cements harden by reaction of the cement with water.

The organic polyglycosides useful in the practice of the invention are compositions of the formula

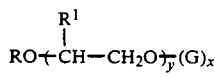

and are well known compositions. The organic glycosides are mixtures of compounds containing different y and x values except when y is 0. The y and x values are average values and are generally not whole numbers. R represents an organic radical containing from about 6 to about 22 carbon atoms. R can be aliphatic, cyclic, aryl, arylalkyl, saturated or unsaturated. Preferably, R represents a saturated or unsaturated aliphatic fatty alcohol residue having from about 6 to about 22 carbon atoms and preferably from 8 to about 18 carbon atoms and most preferably 8 to about 16 carbon atoms.

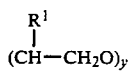

is an ethylene oxide, propylene oxide or butylene oxide residue wherein $R^1$ is H, $CH_3$ or $CH_2CH_3$. Y is a number of from 0 to about 5, and represents the average number of

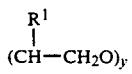

units in the mixture. Preferably y is 0 to about 3. The average y of the mixture is generally not a whole number but y is a whole number in each individual compound in the mixture.

G represents a residue of a reducing sugar such as glucose, lactose, mannose, xylose, fructose and the like or the residue or fragments of a polysaccharide or oligosaccharide such as starch, sucrose, maltose, maltotriose, cellobiose, mellobiose and the like. The organic polyglycosides useful in the practice of the invention are mixtures of mono and polyglycoside compositions. The value x is an average degree of polymerization (DP) and ranges from about 1.0 to about 5 although each polyglycoside in the mixture has a whole number of glycose residue units. Preferably, x is a number in the range of from about 1.05 to about 4 and most preferably from about 1.1 to about 2.5. Mixtures comprising almost 100% monoglycosides (DP less than 1.05) can be used in the practice of the invention.

The organic polyglycosides are well known materials and can be prepared by the methods disclosed in U.S. Pat. No. 3,547,828, U.S. Pat. No. 3,598,865, U.S. Pat. No. 3,772,269 and U.S. Pat. No. 4,939,245.

The organic polyglycosides useful in the practice of the present invention can impart various properties to the aqueous cement containing mixture depending upon the concentration of the organic polyglycoside in relation to the amount of cement present in the mixture. The effect of the organic polyglycoside is also dependent upon the nature of the organic moiety and the DP of the organic glycoside utilized. Generally from about 0.001% by weight of cement to about 3.0% by weight of cement, preferably from about 0.003% by weight of cement to about 1.5% by weight of cement and most preferably from about 0.003% by weight of cement to about 1.0% by weight of cement of the organic glycoside is present in the mixture.

Generally, a small amount of the organic glycoside in relation to the cement present in the aqueous cement composition provides for a substantial reduction in the slump (viscosity) of the composition, retards setting and in addition increases the amount of air entrained in the composition.

At very low levels in the range of from about 0.001 to about 0.1 percent by weight of cement, the addition of the organic glycosides to a cement composition reduces the viscosity (slump) and increases the amount of air entrained in the cement. In the range of below 0.1 percent of the organic glycoside in relation to the cement in the composition, the organic glycoside has only a small effect in retarding the setting time of the composition. However, when the amount of the organic glycoside increases above about 0.1 percent by weight of the cement in the composition, the setting time for the cement is substantially increased. In addition, the amount of air entrained in the composition can become substantial and can reduce the strength of the set cement composition.

When the amount of air entrainment is greater than required, it can be reduced by introducing a foam suppressing agent into the composition. The amount of foam suppressing agent added to the composition is adjusted to reduce the amount of air entrained in the mixture without unduly affecting the retarded setting time of the composition. Foam suppressing agents such as FOAMASTER PD #1, FOAMASTER A Propoxylated Alcohol, FOAMASTER CN can be useful in suppressing foaming of the composition. Generally foam suppressing agents can be present at from about 0.02% to about 1% by weight of the cement and is dependent on the amount of organic glycoside in the composition.

The invention can be more clearly understood by reference to the following examples. The experiments were carried out using Portland Cement Type I from Allentown Cement Company, Inc. Portland Cement Type I (ordinary Portland cement) is the cement used for most general construction. Other types of hydraulic cements are available and fall within the scope of the present invention.

The examples were carried out utilizing three different alkyl polyglucosides. The alkyl polyglucosides utilized in the examples were as follows.

| R | DP |
|---|---|
| I mixture 8/10 (45/55) aliphatic carbon atoms (APG ® 225 surfactant)* | 1.7 |
| II mixture 12/14/16 (68/26/6) aliphatic carbon atoms (APG ® 600 surfactant) | 1.4 |
| III mixture 12/14/16 (68/26/6) aliphatic carbon atoms (APG ® 625 surfactant) | 1.6 |

*APG ® surfactants are products of Henkel Corporation made from a fatty alcohol and dextrose.

The viscosity of the cement compositions of the present invention were measured with a Brookfield viscosimeter equipped with a Helipath attachment using a t-bar spindle rotating at 10 rpm. The results reported are an average of ten measurements.

EXAMPLE 1

A mixture of Portland cement, the organic polyglucoside and deionized water was prepared by hand mixing Portland cement with water containing the predetermined amount of organic polyglucoside to provide a water cement ratio of 0.33. The viscosity was measured 5 minutes after the cement was added to the water.

| Material | Viscosity (centipoise) |
| --- | --- |
| Portland cement | 250,000 |
| Portland cement + 0.6% I | 20,000 |
| Portland cement + 0.6% II | 56,000 |
| Portland cement + 0.6% III | 62,000 |

As can be seen from the examples, the addition of small amounts of the organic polyglucoside to a cement water mixture substantially reduces the viscosity of the mixture. The mixture tested in this Example 1 comprised only cement, water and the organic polyglucoside. The amount of organic glucoside used in the examples is percent by weight of the cement.

It is not understood how the organic glycosides interact with the cement to retard setting; however, studies have shown that the organic glycosides somehow extend the induction period and reduce the intensity of the hydration acceleration stage during which the calcium silicate hydrate gel is rapidly formed.

EXAMPLE 2

Cement Hardening Rate

Qualitative observations were made on hand mixed cement treated with 0.05%, 0.2% and 0.6% of the organic polyglucosides. A mixture was made comprising 120 grams of Portland cement, 40 grams of deionized water containing a sufficient amount of the organic polyglucoside to provide the required amount. The materials were mixed by hand for 2 minutes and the hardness of the mixture was determined at intervals by the Vicat Needle penetration method according to modified ASTM C 191 using a polyethylene sample cup to store the cement paste.

TABLE II

| Organic Polyglycoside | % by Weight of Cement | Time to Harden |
| --- | --- | --- |
| I | 0.05 | within 24 hours |
| I | 0.2 | within 24 hours |
| I | 0.6 | required more than 7 days to harden |
| II | 0.05 | within 24 hours |
| II | 0.2 | within 24 hours |
| II | 0.6 | — |
| III | 0.05 | within 24 hours |
| III | 0.2 | within 24 hours |
| III | 0.6 | within 48 hours |
| no additive | 0 | 5 hours |

Figure 13:
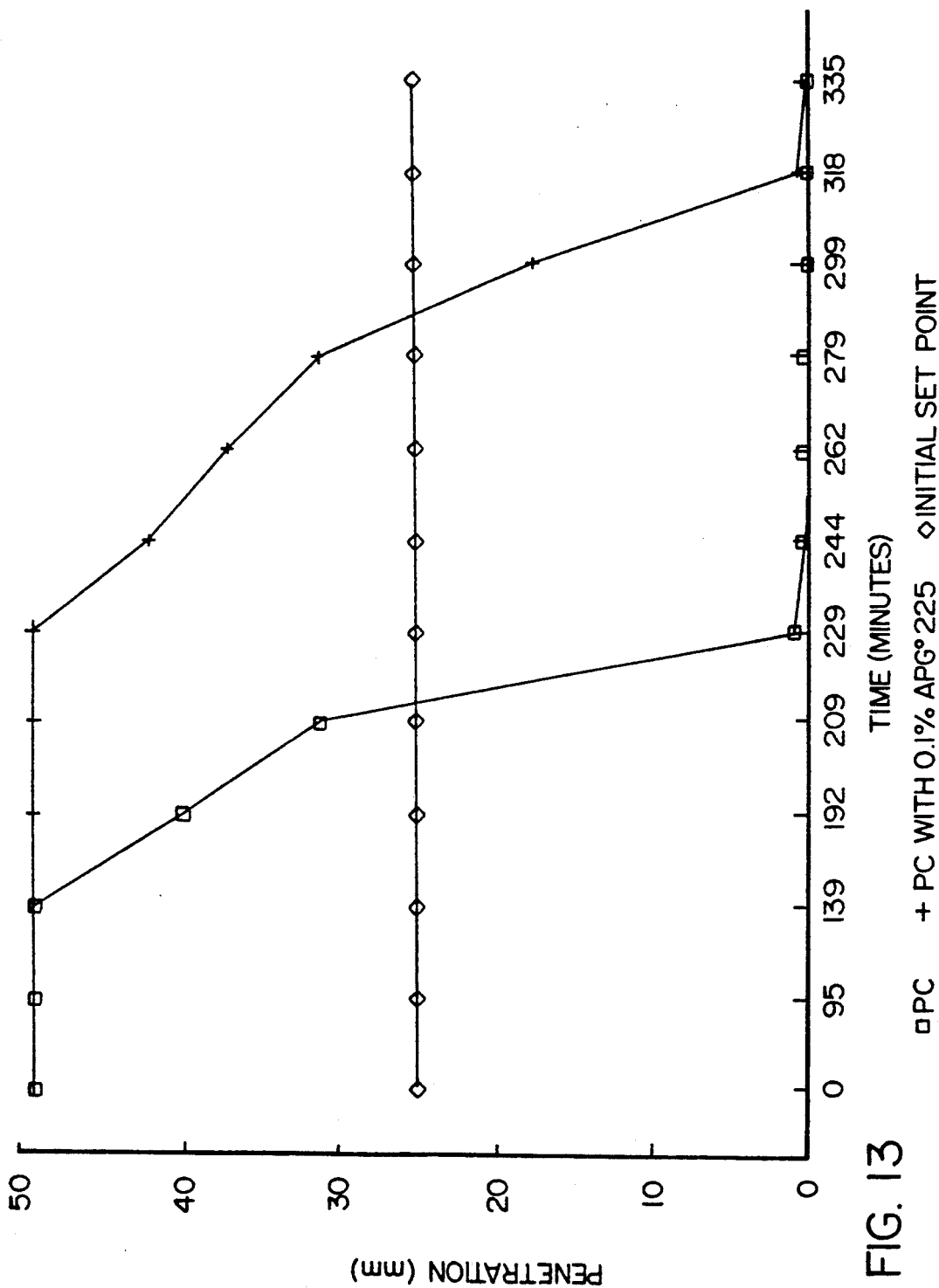
FIG. 13 is an illustration of a plot of needle penetration versus time for a Vicat test of a water-cement mixture containing 0.1% by weight of cement of APG ® 225 surfactant at a water:cement ratio of 0.5.

An illustration of the measurements of the Vicat Needle test is shown in FIG. 13.

EXAMPLE 3

Six-tenths of one percent by weight of cement of the organic polyglucoside I, II and III were added to a cement water mixture of Example II and mixed in a Hobart Mixer for 1½ minutes according to ASTM C 305-82 (reapproved 1987). The samples were then poured into plastic cups, covered and stored in an atmosphere of about 100% humidity. The samples were removed from the humidity chamber at regular intervals and tested with a Vicat Needle penetration tester. Addition of alkyl polyglycoside II and III at 0.6% by weight of cement permitted full Vicat Needle penetration after 48 hours. The Vicat Needle penetration for II and III was 0-7 millimeters after 64 hours. The cement mixture containing 0.6% by weight of cement of I alkyl glucoside was fully penetrated by the Vicat Needle for more than 10 days. The Portland cement without the organic polyglucoside was completely solid and dry after 17 hours.

EXAMPLE 4

To determine the setting properties of a cement water mixture, the heat emission from the cement, water and organic polyglucoside additive was measured in a Technical Innovations Conducting (Isothermal) Calorimeter with computerized data acquisition. The sample mixtures of water, cement and the organic polyglucoside were maintained at 25° C. (±0.01° C.) in a controlled temperature bath. In the tests, 4.0 grams of cement and 2.0 grams of a solution of the surfactant in deionized water (equilibrated to 25° C. were mixed at 25° C. for 30 seconds in the calorimeter and the measurements made over the time period shown.

TABLE IV

| Organic Polyglycoside | % By Weight of Cement | Hydration Time |
| --- | --- | --- |
| 0 | 0 | 8 hours |
| I | 0.1 | 9.45 hours |
| I | 0.6 | more than 122 hours |
| II | 0.1 | 9.6 hours |
| II | 0.6 | 31.6 hours |
| III | 0.1 | 10.6 hours |
| III | 0.6 | 32.1 hours |

FIGS. 1 through 12 show the rate of heat release, as determined by a Technical Innovations Conducting (Isothermal) Calorimeter with computerized data acquisition over extended time periods, of Portland cement-water mixtures (water:cement ratio 0.5) containing organic glucoside compositions. FIGS. 1, 5 and 9, FIGS. 2, 6, FIGS. 3, 10, FIGS. 4, 12 show measurements made on the same samples over three different time periods so that the effect of the organic polyglycoside could be more easily compared to the rate of heat release of the Portland cement control.

Figure 2:
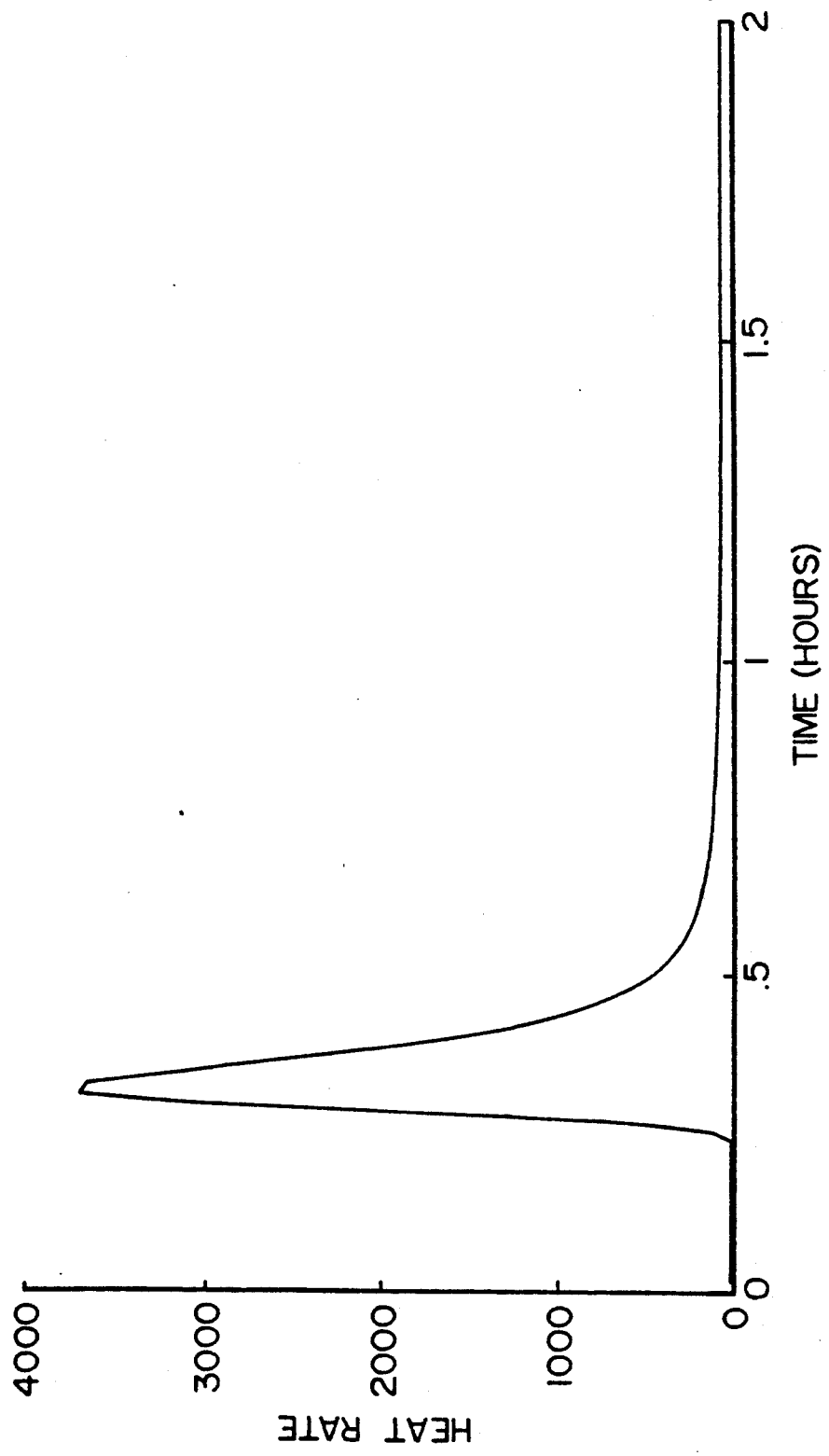
FIG. 2 is a graph showing rate of heat release for a mixture of Portland cement with 0.1% by weight of cement of APG ® 225 surfactant at a water:cement ratio of 0.5 for a two hour period.
Figure 3:
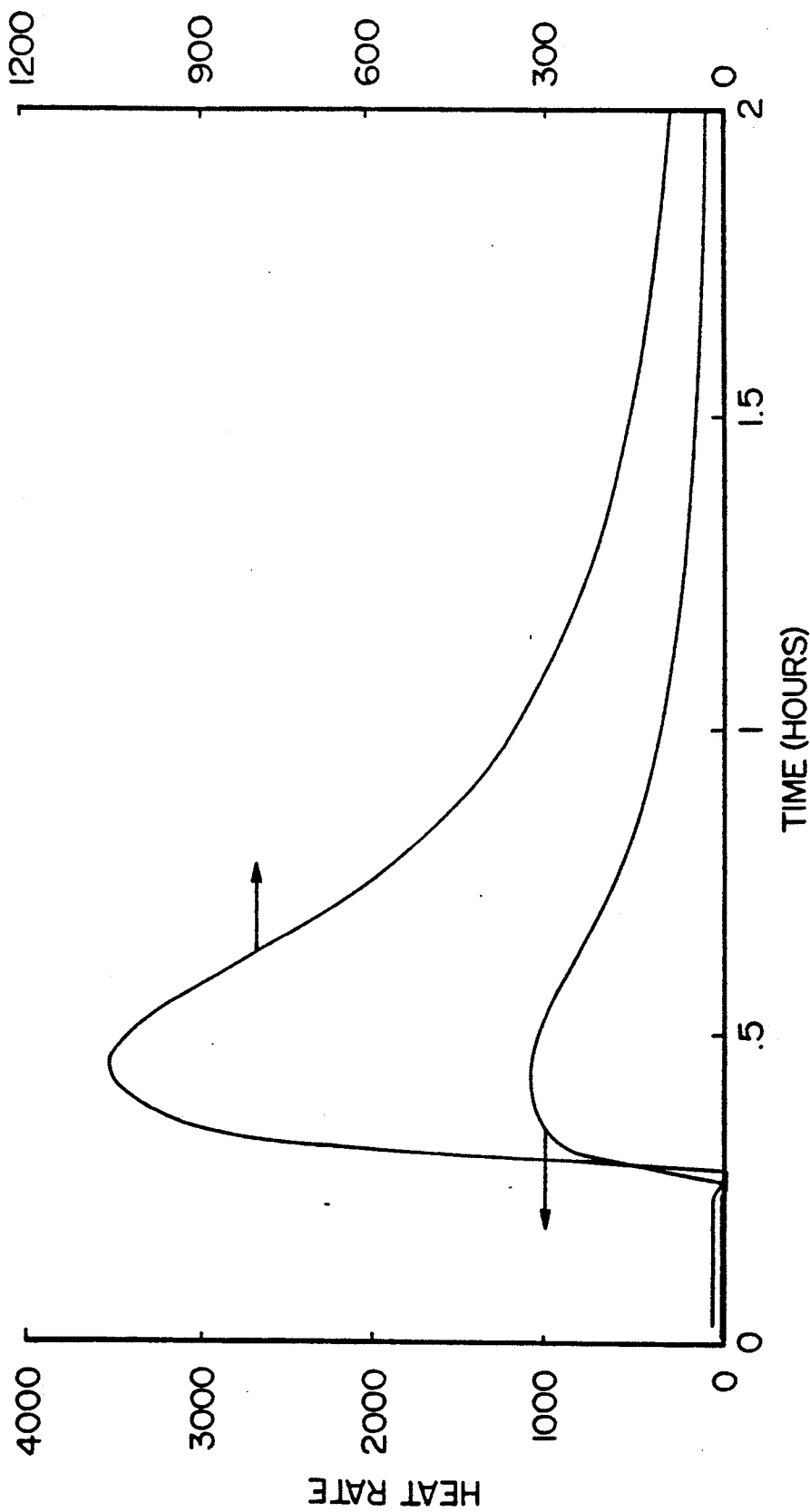
FIG. 3 is a graph showing rate of heat release for a mixture of Portland cement with 0.62% by weight of cement of APG ® 225 surfactant at a water:cement ratio of 0.5 for a two hour period. The graph shows the same data on two scales of rate of heat release.

An illustration of the effect of the organic glucoside in setting of Portland cement can most readily be seen by comparison of the rate of heat release over the first two hours after mixing the water and organic polyglucoside with the cement. A comparison of FIGS. 1, 2 and 3 shows the delay in the initial wetting and dissolution and a reduction in the maximum rate of heat release between the Portland cement control, a Portland cement mixture containing 0.1% by weight of cement of I and a Portland cement mixture containing 0.62% by weight I. The reduction in the rate of heat release is indicative of a delay in the rate at which dry cement is wetted and dissolved in the mixture. When 0.1% by weight of the cement of I is added to the water:cement mixture, the heat release during the initial wetting and dissolution is delayed by about 7 minutes and the maximum rate of heat release is reduced (see FIG. 2).

When 0.62% by weight of cement of I is added to the mixture, the maximum rate of heat release of initial wetting and dissolution is delayed by about 15 minutes and the maximum rate of heat release is about one-fourth of the maximum rate of heat release during wetting and solution of the control. The initial solution and wetting period is extended from about 20 minutes to about 1.25 hours.

Figure 4:
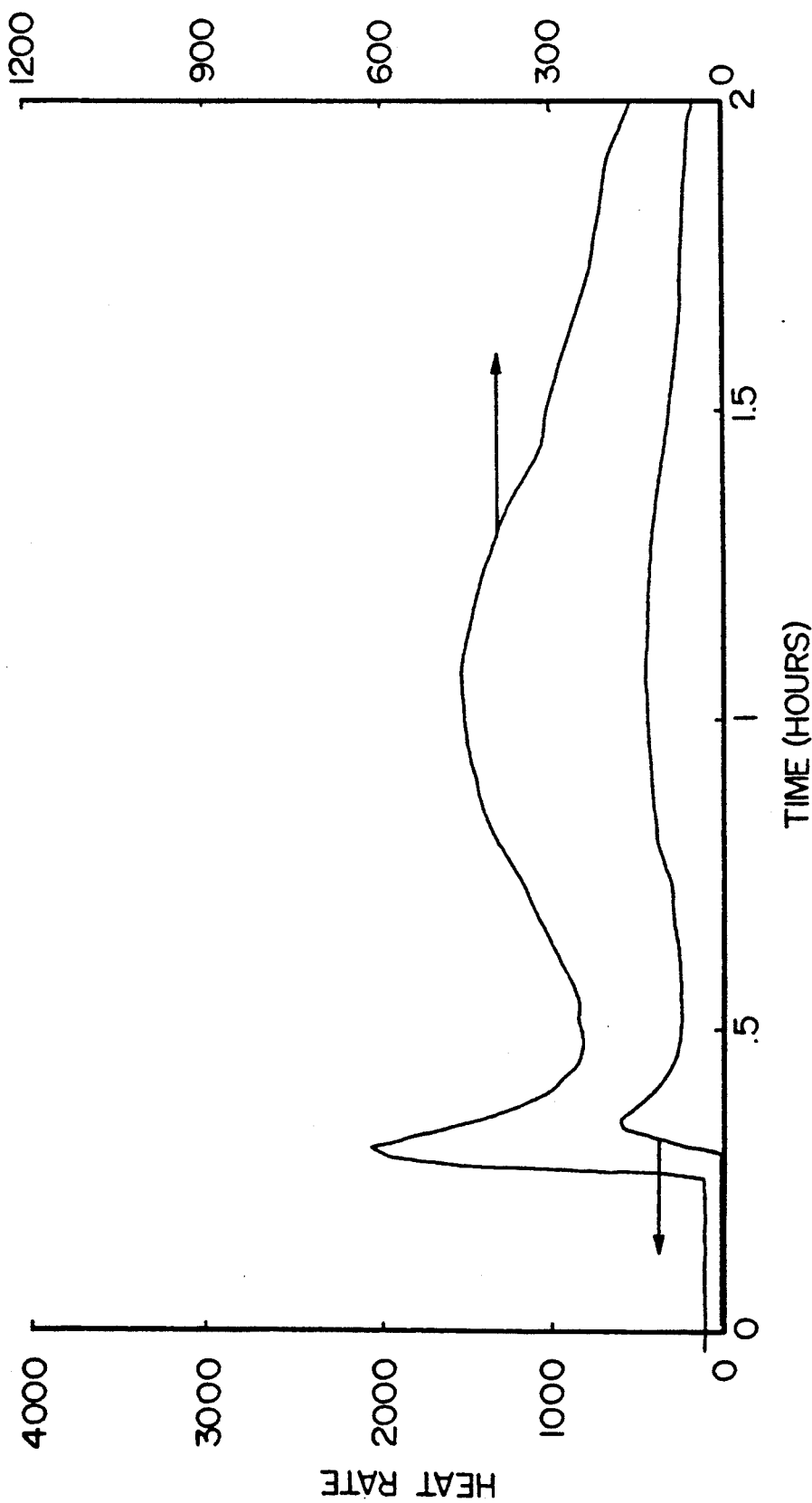
FIG. 4 is a graph showing rate of heat release for a mixture of Portland cement with 0.62% by weight of cement of APG ® 625 surfactant at a water:cement ratio of 0.5 for a two hour period. The graph shows the same data on two scales of rate of heat release.
Figure 5:
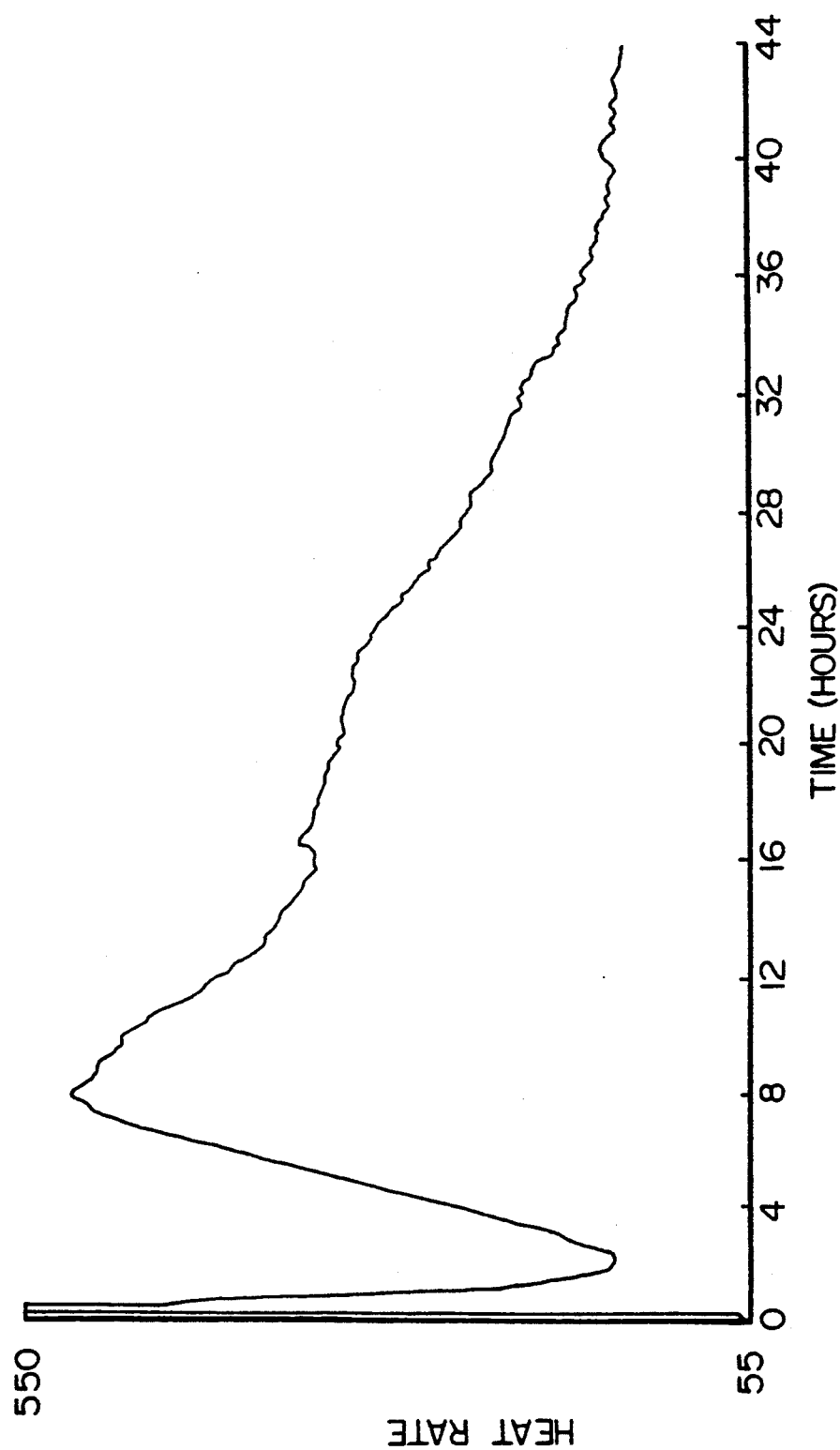
FIG. 5 is a graph showing rate of heat release for Portland cement at a water:cement ratio of 0.5 for a 44 hour period.
Figure 6:
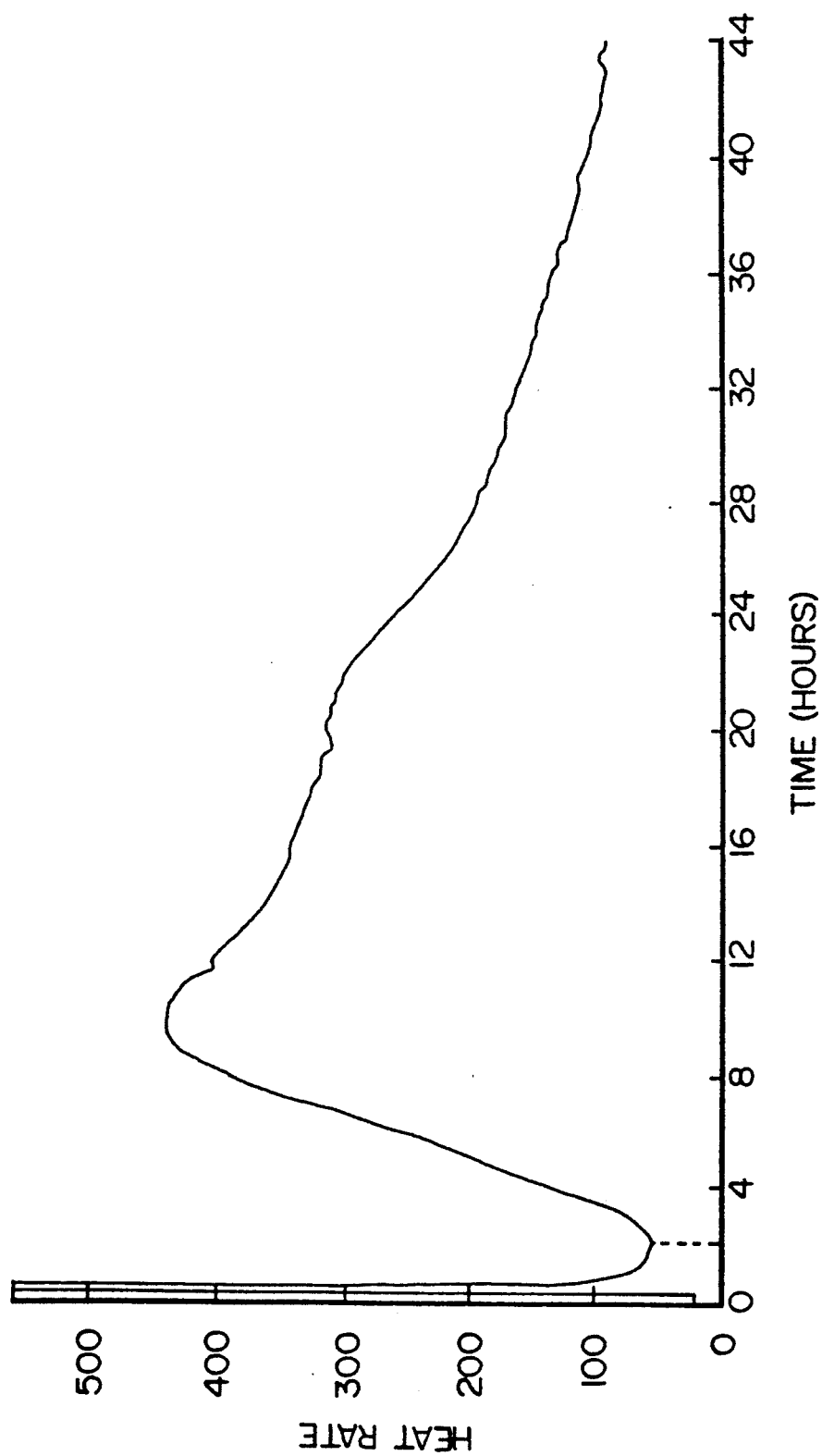
FIG. 6 is a graph showing rate of heat release for Portland cement containing 0.1% by weight of cement of APG ® 225 surfactant at a water:cement ratio of 0.5 for a 44 hour period.
Figure 7:
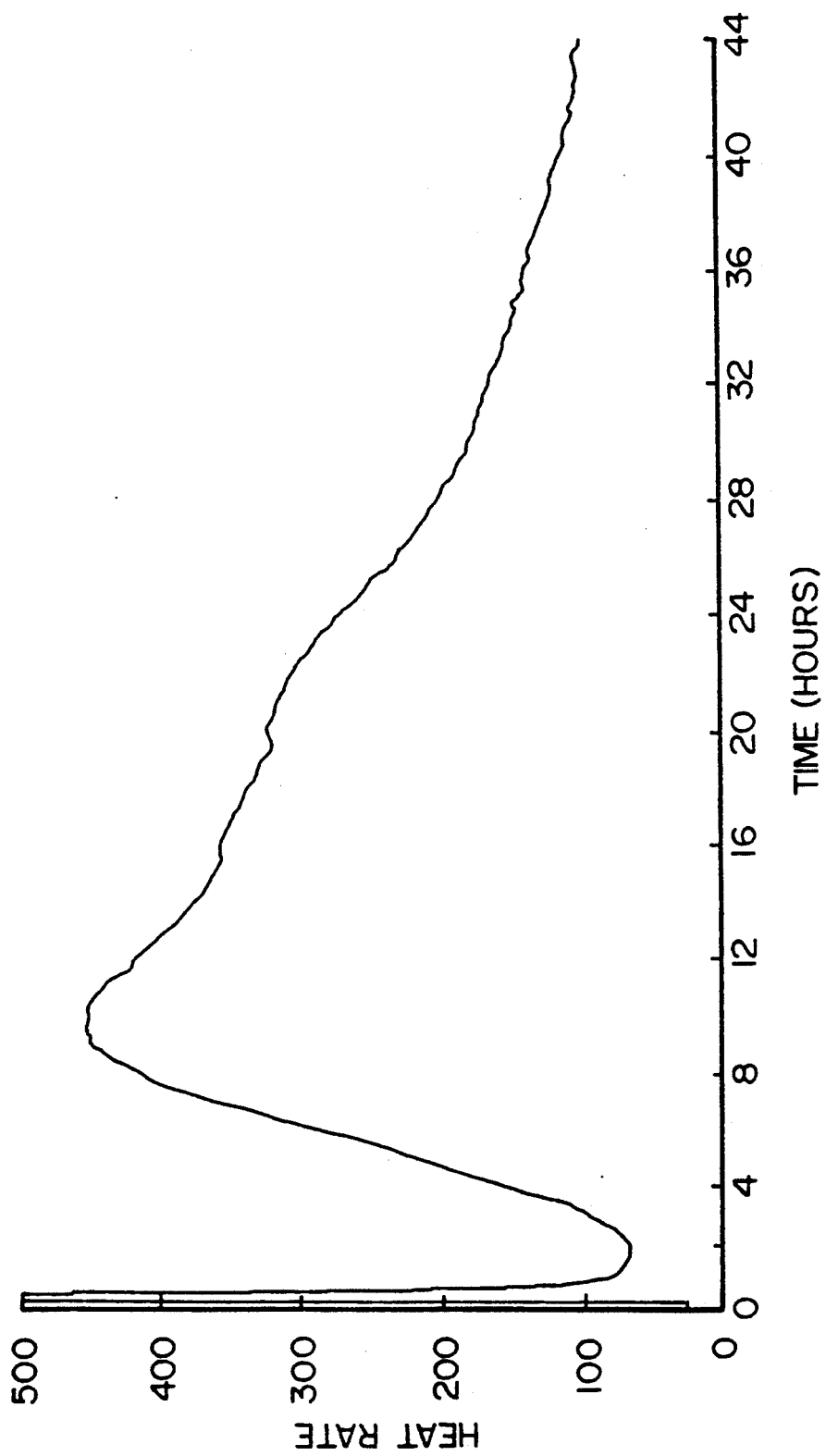
FIG. 7 is a graph showing the rate of heat release for Portland cement containing 0.1% by weight of cement of APG ® 600 surfactant, at a water:cement ratio of 0.5, for a 44 hour period.
Figure 8:
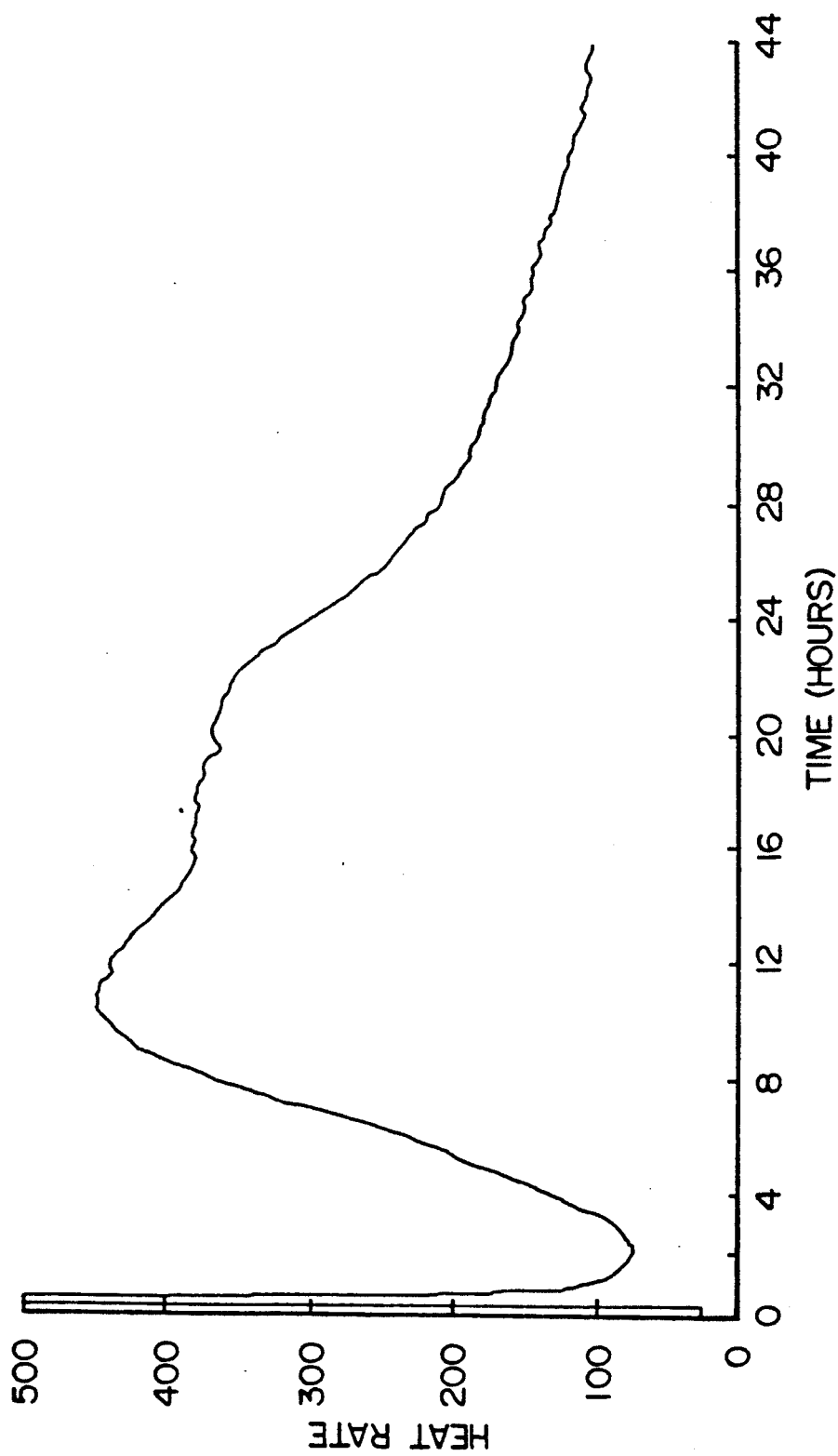
FIG. 8 is a graph showing the rate of heat release for Portland cement containing 0.1% by weight of cement of APG ® 625 surfactant, at a water:cement ratio of 0.5 for a 44 hour period.
Figure 9:
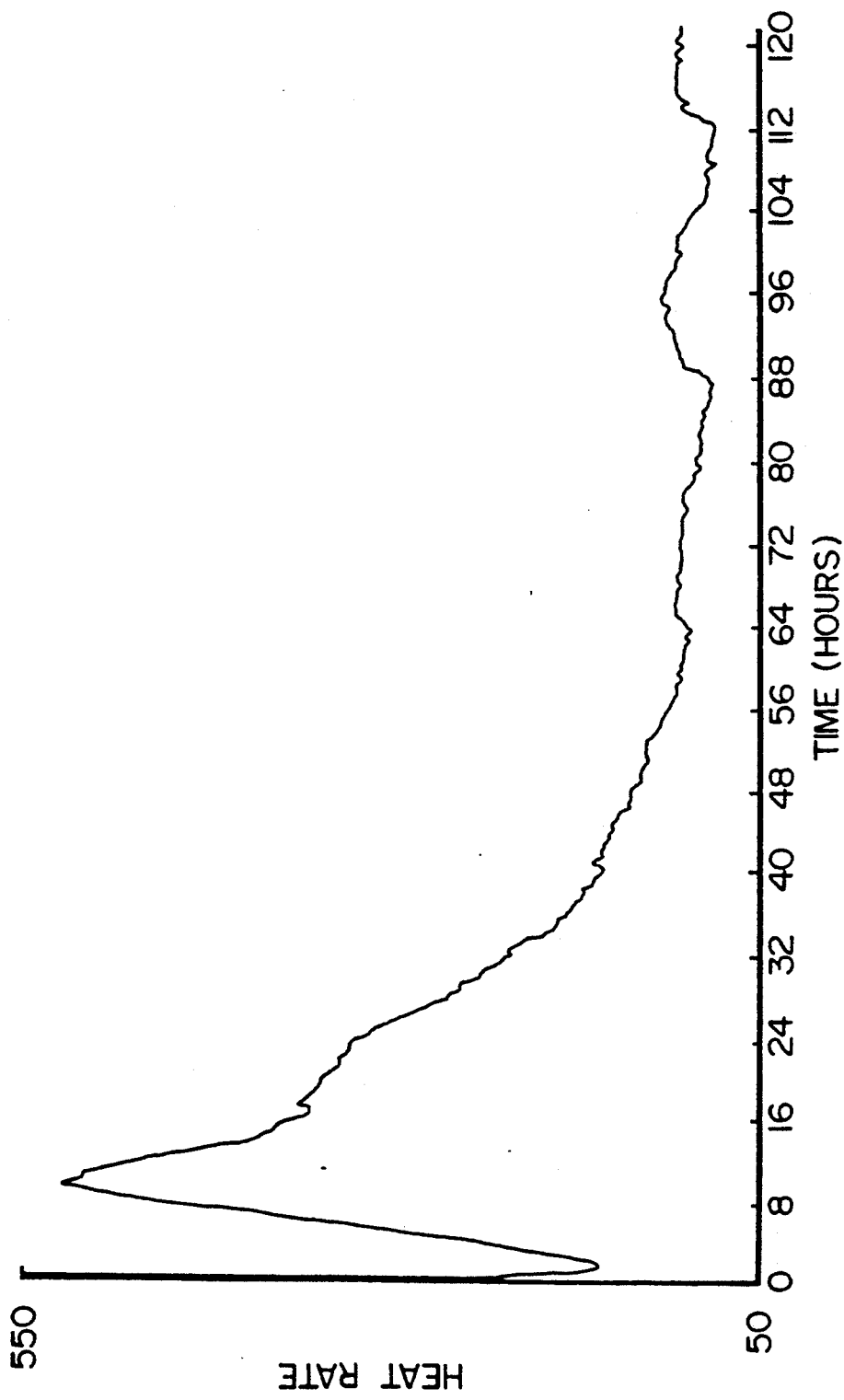
FIG. 9 is a graph showing the rate of heat release for Portland cement at a water:cement ratio of 0.5 for a 120 hour period.
Figure 10:
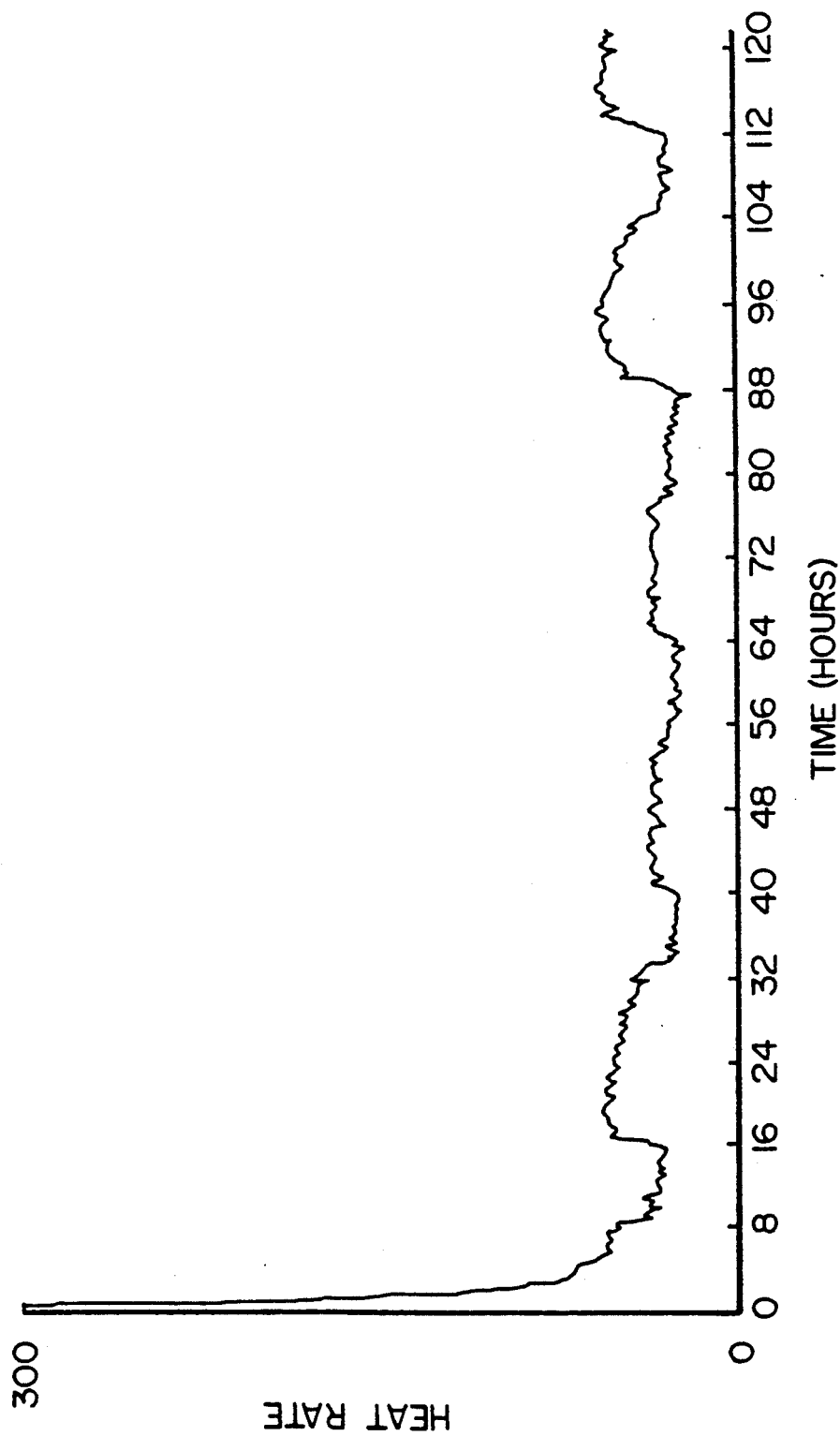
FIG. 10 is a graph showing the rate of heat release for Portland cement containing 0.62% by weight of cement of APG ®225 surfactant at a water:cement ratio of 0.5 for 120 hours.
Figure 11:
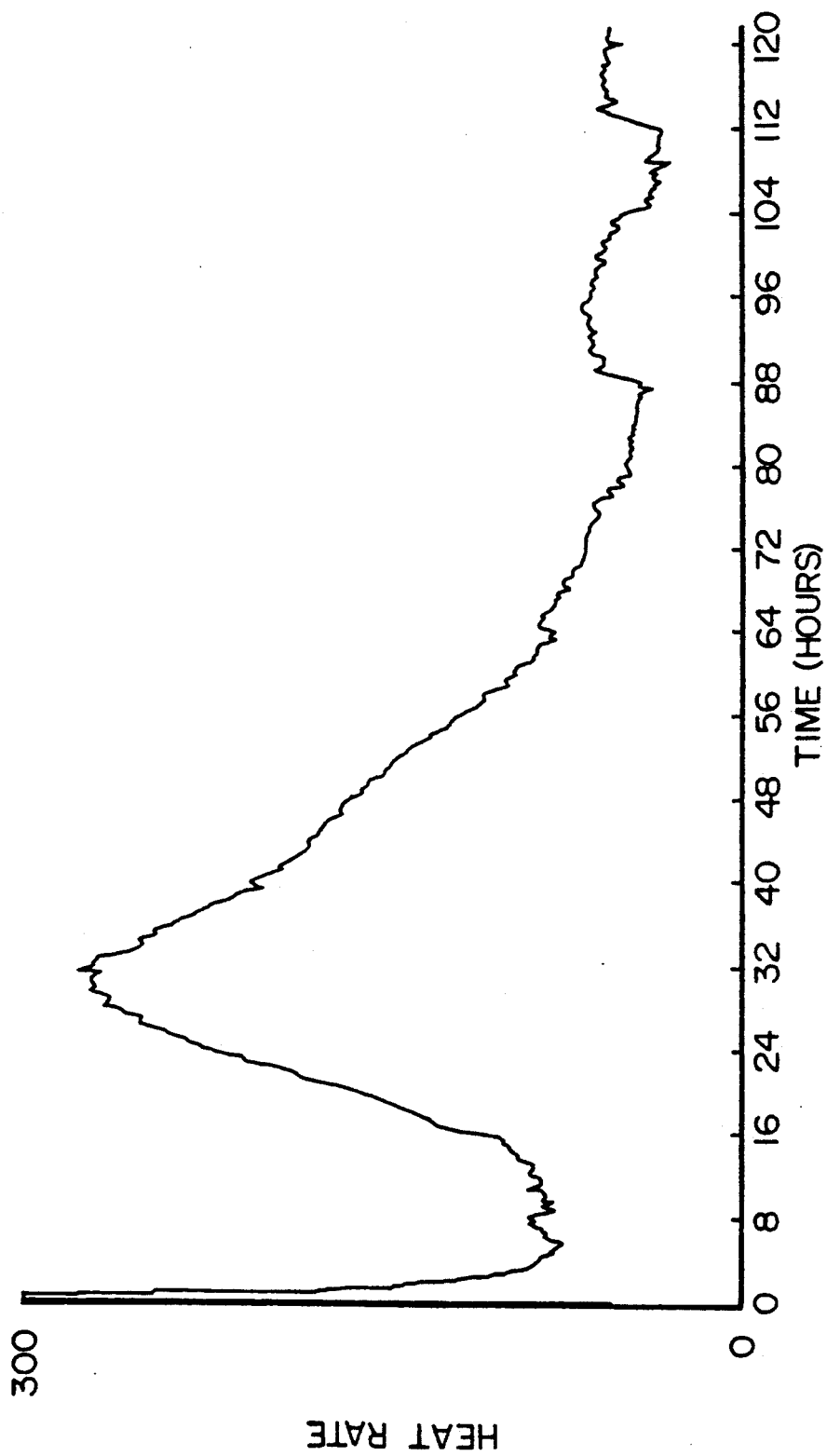
FIG. 11 is a graph showing the rate of heat release for Portland cement containing 0.62% by weight of cement of APG ® 600 surfactant at a water:cement ratio of 0.5 for 120 hours.
Figure 12:
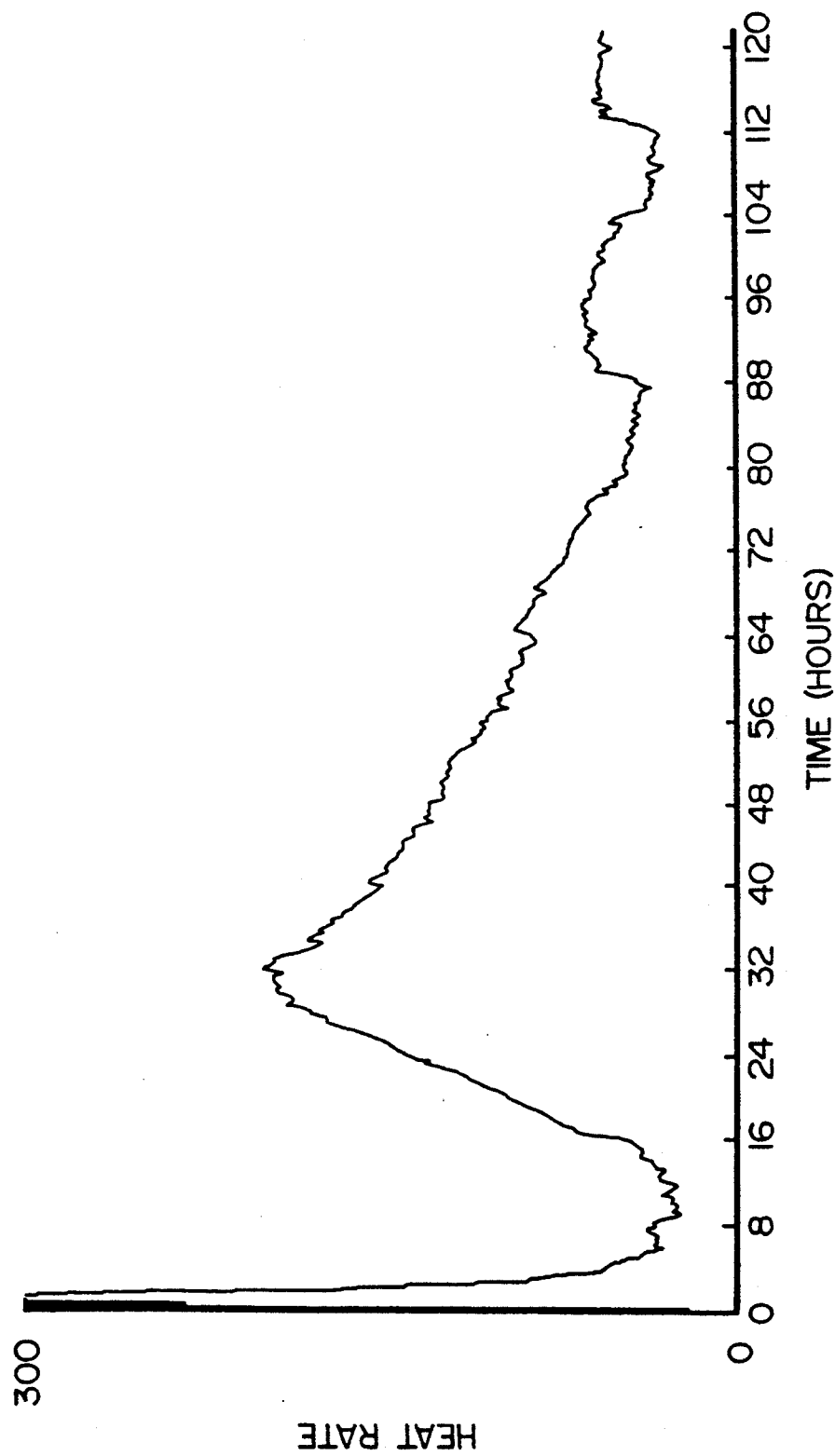
FIG. 12 is a graph showing the rate of heat release for Portland cement containing 0.62% by weight of cement of APG ® 625 surfactant at a water:cement ratio of 0.5 for 120 hours.

FIG. 4 shows the rate of heat release of a water-Portland cement mixture containing 0.62% by weight of cement of III at a water:cement ratio of 0.5. The figure shows a delay in the initial solution and wetting isotherm and a reduction in the maximum rate of heat release similar to that shown in FIG. 3.

FIGS. 5, 6, 7 and 8 provide a comparison of the rate of heat release of the control (FIG. 5) with water-cement mixtures containing I, II and III at a 0.1% concentration by weight of the cement over a 44 hour period. A clear delay in the time of maximum rate of heat release for the hydration or accelerated setting phase and a reduction of the maximum rate of heat release for the hydration phase heat release can be seen. The organic glucosides I, II and III appear to reduce the maximum rate of heat release and extend the heat release period over that shown by the control.

FIGS. 9, 10, 11 and 12 show the effect on rate of heat release over a 120 hour period of a control and Portland cement-water mixtures containing 0.62% by weight of the cement of organic polyglycosides I, II and III. It is clear that the rate of heat release is substantially changed by the addition of I, II and III. The maximum rate of heat release is substantially reduced and the time is substantially extended for the hydration or accelerated setting heat release peak which occurs at 8 hours in the control and at about 32 hours in the composition containing 0.62% by weight of cement of II and III.

In the composition containing 0.62% by weight of the cement of I, the hydration or accelerated setting heat release peak is substantially reduced or is delayed beyond the 120 hours of the test. Clearly, FIGS. 9, 10, 11 and 12 show a substantial retardation in the setting time of the cement-water mixture due to the presence of the organic glycosides I, II and III.

EXAMPLE 5

A control concrete mixture was prepared according to the following formulation.

| Cement | 12.03 lb. |
| --- | --- |
| Sand | 21.6 lb. |
| Stone | 17.97 lb. |
| Water | 6.01 lb. |
| Water/cement ratio: | 0.5 |

To the formulations were added 0.1% by weight of the cement of the organic polyglycosides I, II or III. The amount of water in the control formulation was reduced to provide a mixture with a slump in the same range as the slump of the control. The results of the tests are shown in Table 1. As can be seen from Table I, the addition of 0.1% by weight of the organic polyglycoside based on the weight of cement in the concrete, produced a concrete with a substantial reduction in the water required to produce a concrete with a 5-6 inch slump. The air entrained in the concrete mixture was greater than 12%. The concrete was light and foamy. The large amount of air entrained in the concrete substantially reduced the compressive strength of the concrete. The amount of entrained air can be controlled by including a foam inhibitor in the concrete formulation.

TABLE 1

| COMPOSITION | WATER CEMENT RATIO | SLUMP | % AIR ENTRAIN- MENT | COMPRESSION STRENGTH POUNDS PER SQUARE INCH | | |
| --- | --- | --- | --- | --- | --- | --- |
| | | | | 24 HRS | 13 DAYS | 7 DAYS |
| CONTROL | .5 | 4 in. | 4% | 2430 | 4430 | |
| CONTROL + 0.1% I | .44 | 6¼ in | >12% | Hard but low strength | 570 | |
| CONTROL + 0.1% II | .44 | 5¼ in | >12% | Hard but low strength | 570 | |
| CONTROL + 0.1% III | .44 | 6 in | >12% | Hard but low strength | 570 | |
| CONTROL | .49 | 3 in | 3¼% | 2290 | | 3860 |
| CONTROL + 0.05% I | .45 | 5 in | >12% | 150 | | 720 |
| CONTROL + 0.05% I + 0.10% ANTI FOAM | .49 | 3 IN | 3¼% | 2290 | | 4070 |
| CONTROL | .48 | 3 in | 4% | 2570 | | |
| CONTROL + 0.005% I | .47 | 3¼ in | 8¼% | 2000 | | |

The antifoam agent used in the tests shown in Table 1 was FOAMASTER A, a cement anti-foam agent manufactured by Henkel Corp.

The air entrainment was measured according to the Chase method.

The slump was measured according to ASTM C-143-90a procedure.

The compressive strength was measured according to ASTM C-39-86$^{E1}$ method.

The results of the tests reported in Table 1 illustrate the effect of the organic glycoside composition I, on air entrainment, and slump of a concrete mixture. The air entrainment properties of the alkyl glycoside can be controlled by addition of an antifoam agent to the mixture.

The organic glycosides of the formula

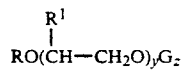

wherein R, $R^1$, G, y and z are defined above are useful as set retarders, viscosity reducers and air entraining agents for mixtures containing water and hydraulic cement and particularly Portland cement.

We claim:

1. A hydraulic cement composition comprising water; hydraulic cement; and from about 0.001% to about 3.0% by weight of the cement of an organic polyglycoside of the formula

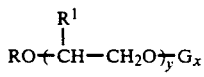

wherein R is an organic radical having from about 6 to about 22 carbon atoms which can be aliphatic, cyclic or aromatic, saturated or unsaturated, $R^1$ is H, or an alkyl group containing 1 or 2 carbon atoms, G is a residue of a reducing sugar and x is a number of from about 1.0 to about 5 and y is a number of from 0 to 5.

2. A composition of claim 1 wherein y is 0.

3. A composition of claim 1 further comprising a foam reducing effective amount of an antifoam additive.

4. A composition of claim 2 wherein R is an alkyl group with from 8 to about 16 carbon atoms and x is from about 1.05 to about 4.0.

5. A composition of claim 2 further comprising a foam reducing effective amount of an antifoam agent.

6. A composition of claim 1 containing from about 0.001 to about 1.0 percent by weight of cement of the organic polyglycoside.

7. A composition of claim 6 wherein R is an alkyl group with from 6 to 16 carbon atoms and x is from 1.1 to about 2.0 and y is 0.

8. A composition of claim 7 where R is an alkyl group containing from 6 to about 10 carbon atoms.

9. A composition of claim 7 further containing a foam reducing effective amount of an antifoam agent.

10. A composition of claim 8 containing a foam reducing effective amount of an antifoam agent.

11. A method for affecting at least one property of an aqueous cement containing composition selected from the group consisting of setting time, air entrainment and slump which comprises adding to the cement containing composition from about 0.001% to about 3.0% by weight of cement of an organic polyglycoside of the formula

wherein R is an organic radical having from about 6 to about 22 carbon atoms which can be aliphatic, cyclic or aromatic, saturated or unsaturated, $R^1$ is H, or an alkyl group containing 1 or 2 carbon atoms, G is a residue of a reducing sugar and x is a number of from about 1.0 to about 5 and y is number of from 0 to 5.

12. A method of claim 11 wherein y is 0.

13. A method of claim 11 additionally comprising adding a foam reducing amount of an antifoam additive to the cement containing composition.

14. A method of claim 11 where R is an alkyl group with from 6 to 16 carbon atoms and x is from 1.05 to about 4.0.

15. A method of claim 11 wherein from about 0.001% to about 1.0% by weight of cement of the organic polyglycoside is added to the cement containing composition.

16. A method of claim 11 wherein R is an alkyl group with from 6 to 16 carbon atoms and x is from 1.1 to about 2 and y is 0.

17. A method of claim 16 wherein R is an alkyl group containing from 6 to about 10 carbon atoms.

* * * * *